(12) United States Patent
Bazarsky et al.

(10) Patent No.: US 12,541,621 B2
(45) Date of Patent: Feb. 3, 2026

(54) ENHANCED END TO END PROTECTION IN KEY VALUE STORAGE DEVICES

(71) Applicant: Sandisk Technologies, Inc., Milpitas, CA (US)

(72) Inventors: Alexander Bazarsky, Holon (IL); David Avraham, Even Yehuda (IL); Ran Zamir, Ramat Gan (IL)

(73) Assignee: Sandisk Technologies, Inc., Milpitas, CA (US)

( * ) Notice: Subject to any disclaimer, the term of this patent is extended or adjusted under 35 U.S.C. 154(b) by 106 days.

(21) Appl. No.: 18/359,167

(22) Filed: Jul. 26, 2023

(65) Prior Publication Data

US 2025/0036814 A1    Jan. 30, 2025

(51) Int. Cl.
    *G06F 21/64*      (2013.01)
    *G06F 21/60*      (2013.01)
    *G06F 21/79*      (2013.01)

(52) U.S. Cl.
    CPC ............ *G06F 21/64* (2013.01); *G06F 21/602* (2013.01); *G06F 21/79* (2013.01)

(58) Field of Classification Search
    CPC ......... G06F 21/64; G06F 21/602; G06F 21/79
    USPC ....................................................... 714/799
    See application file for complete search history.

(56) References Cited

U.S. PATENT DOCUMENTS

| | | | |
|---|---|---|---|
| 7,426,674 B2 | 9/2008 | Anderson et al. | |
| 8,910,031 B1 * | 12/2014 | Liu | H03M 13/09 |
| | | | 714/766 |
| 10,073,732 B2 | 9/2018 | Lee et al. | |
| 10,877,842 B2 * | 12/2020 | Nguyen | G06F 11/1004 |
| 11,681,581 B1 | 6/2023 | Ilani et al. | |
| 2010/0318887 A1 | 12/2010 | Zvibel | |
| 2011/0239098 A1 | 9/2011 | Fisher-Jeffes | |
| 2016/0179428 A1 | 6/2016 | Parker et al. | |
| 2019/0079827 A1 * | 3/2019 | Nguyen | G06F 11/1004 |
| 2020/0264949 A1 * | 8/2020 | Jhang | G06F 11/108 |
| 2020/0272533 A1 * | 8/2020 | Privitt | G06F 11/1637 |
| 2021/0004177 A1 * | 1/2021 | Lee | G06F 3/0604 |
| 2021/0034457 A1 * | 2/2021 | Kim | G06F 11/0772 |
| 2022/0229725 A1 * | 7/2022 | Kanter | H03M 13/09 |

(Continued)

OTHER PUBLICATIONS

International Search Report and Written Opinion for Application No. PCT/US2024/029872 dated Sep. 19, 2024.

*Primary Examiner* — Albert Decady
*Assistant Examiner* — Osman M Alshack
(74) *Attorney, Agent, or Firm* — Patterson + Sheridan, LLP (57) ABSTRACT

Key value (KV) pair data includes a key and a value, where the key addresses the value. The value may include one or more flash management units (FMUs). Because the value is read in order, sequentially from one FMU to a next FMU, end-to-end (E2E) protection of the value may be optimized and improved. E2E protection may including using checksum signatures, of which cyclic redundancy code (CRC) signatures are but one example, to ensure that corrupted data is not returned to a host device. Optimizing checksum signatures used to protect the value may include generating an aggregated checksum signature for each FMU based on a current FMU and each previous FMU of the value or only generating a single checksum signature for an entirety of the value. Thus, characteristics of the value may be taken advantage of in order to improve and optimize E2E protection.

20 Claims, 8 Drawing Sheets

(56) References Cited

U.S. PATENT DOCUMENTS

2022/0414059 A1* 12/2022 Lee .................... G06F 16/17
2023/0195377 A1   6/2023 Avraham et al.
2023/0305925 A1* 9/2023 Kanter ............... G06F 11/1048

* cited by examiner

ENHANCED END TO END PROTECTION IN KEY VALUE STORAGE DEVICES

BACKGROUND OF THE DISCLOSURE

Field of the Disclosure

Embodiments of the present disclosure generally relate to data storage devices, such as solid state drives (SSDs), and, more specifically, improving end-to-end (E2E) protection for key value (KV) data storage devices.

Description of the Related Art

A KV database works by storing a quantity of user data that is associated with a key that is addressable as a complete entity. Examples of user data that can be stored in a KV database may include photos, records, and files. From a host device point-of-view, the photo, the record, or the file may be retrieved using a single key/address, rather than using multiple addresses that include data of the photo, the record, or the file. The data is stored as unstructured data and may be addressed using a key of variable length. Storage space of a memory device may be allocated for KV pair data in increments of bytes, where a length value of the KV pair data is associated with the necessary storage space to store the KV pair data.

Using a KV database in a data storage device may increase the performance of the data storage device. For example, the number of data transfers/second may be improved because the KV pair data to physical storage location translation layer in the host device may be removed. Furthermore, the number of commands over the bus may be reduced since an entire KV pair data may utilize a single transfer. End-to-end (E2E) protection of data is vital as data integrity is one of the most important requirements for data storage devices, which demands extremely low probabilities for occurrences of undetected data corruption. However, E2E protection for KV pair data is generated for each FMU of a value without any optimization or awareness of the structure of the KV pair data.

Therefore, there is a need in the art for improving and optimizing E2E protection of KV pair data.

SUMMARY OF THE DISCLOSURE

The present disclosure generally relates to data storage devices, such as solid state drives (SSDs), and, more specifically, improving end-to-end (E2E) protection for key value (KV) data storage devices. KV pair data includes a key and a value, where the key addresses the value. The value may include one or more flash management units (FMUs). Because the value is read in order, sequentially from one FMU to a next FMU, E2E protection of the value may be optimized and improved. E2E protection may include using checksum signatures to ensure that corrupted data is not returned to a host device. Optimizing checksum signatures used to protect the value may include generating an aggregated checksum signature for each FMU based on a current FMU and each previous FMU of the value or only generating a single checksum signature for an entirety of the value. Thus, characteristics of the value may be taken advantage of in order to improve and optimize E2E protection.

In one embodiment, a data storage device includes a memory device and a controller coupled to the memory device. The controller is configured to receive key value (KV) pair data from a host device, where the KV pair data includes a key and a value, where the key addresses the value, and where the value includes two or more flash management units (FMUs), generate a first checksum signature for the received value, where the first checksum signature is generated for an aggregated number of consecutive adjacent FMUs of the value, and program the generated first checksum signature and the value to the memory device.

In another embodiment, a data storage device includes a memory device and a controller coupled to the memory device. The controller is configured to generate a checksum signature for a value of a key value (KV) pair data. The KV pair data includes a key and a value. The key addresses the value. The value includes two or more flash management units (FMUs). The checksum signature is generated for a first FMU and each two or more consecutive adjacent FMUs after the first FMU.

In another embodiment, a data storage device includes means to store data and a controller coupled to the means to store data. The controller is configured to generate a checksum signature for each flash management unit (FMU) of a value of a key value (KV) pair data, where the KV pair data comprises a key and the value, where the key addresses the value, where the value comprises a plurality of FMUs, and where the checksum signature generated for each of the FMUs other than a first FMU of the plurality of FMUs is associated with a current FMU and each previous FMU of the plurality of FMUs, program the value and each checksum signature to the means to store data, receive a read request comprising the key from a host device, retrieve the value and a checksum signature associated with an FMU requested by the read request from the means to store data, generate another checksum signature for the retrieved value, wherein the another checksum signature is associated with the FMU requested and each previous FMU relative to the FMU requested, determine that the another checksum signature matches the checksum signature retrieved, and provide the value to the host device.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, improving end-to-end (E2E) protection for key value (KV) data storage devices. KV pair data includes a key and a value, where the key addresses the value. The value may include one or more flash management units (FMUs). Because the value is read in order, sequentially from one FMU to a next FMU, E2E protection of the value may be optimized and improved. E2E protection may including using checksum signatures, of which cyclic redundancy code (CRC) signatures are but one example, to ensure that corrupted data is not returned to a host device. Optimizing checksum signatures used to protect the value may include generating an aggregated checksum signature for each FMU based on a current FMU and each previous FMU of the value or only generating a single checksum signature for an entirety of the value. Thus, characteristics of the value may be taken advantage of in order to improve and optimize E2E protection.

Figure 1:
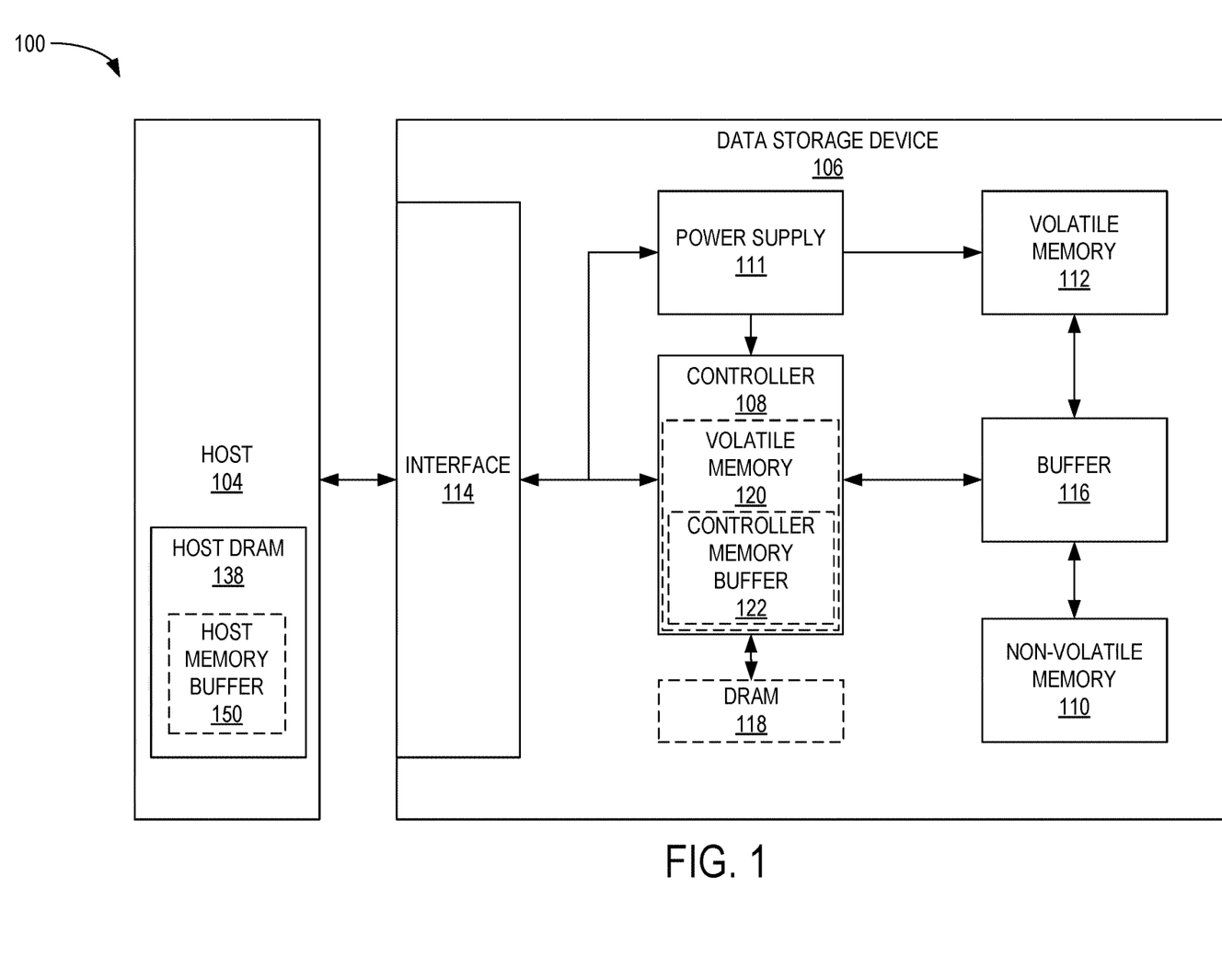
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). It is to be understood in that the listed memory architectures are not intended to be limiting, but to provide examples of possible embodiments. For example, it is contemplated that higher level cell memory may be applicable, such as penta level cell (PLC) memory and the like (e.g., 6-level cell, 7-level cell, etc.). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), synchronous dynamic RAM (SDRAM (e.g., DDR1, DDR2, DDR3, DDR3L, LPDDR3, DDR4, LPDDR4, and the like)), pseudo SRAM (PSRAM) block RAM (BRAM), thyristor RAM (TRAM), accelerator RAM (XRAM), and the like. Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory 120 to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
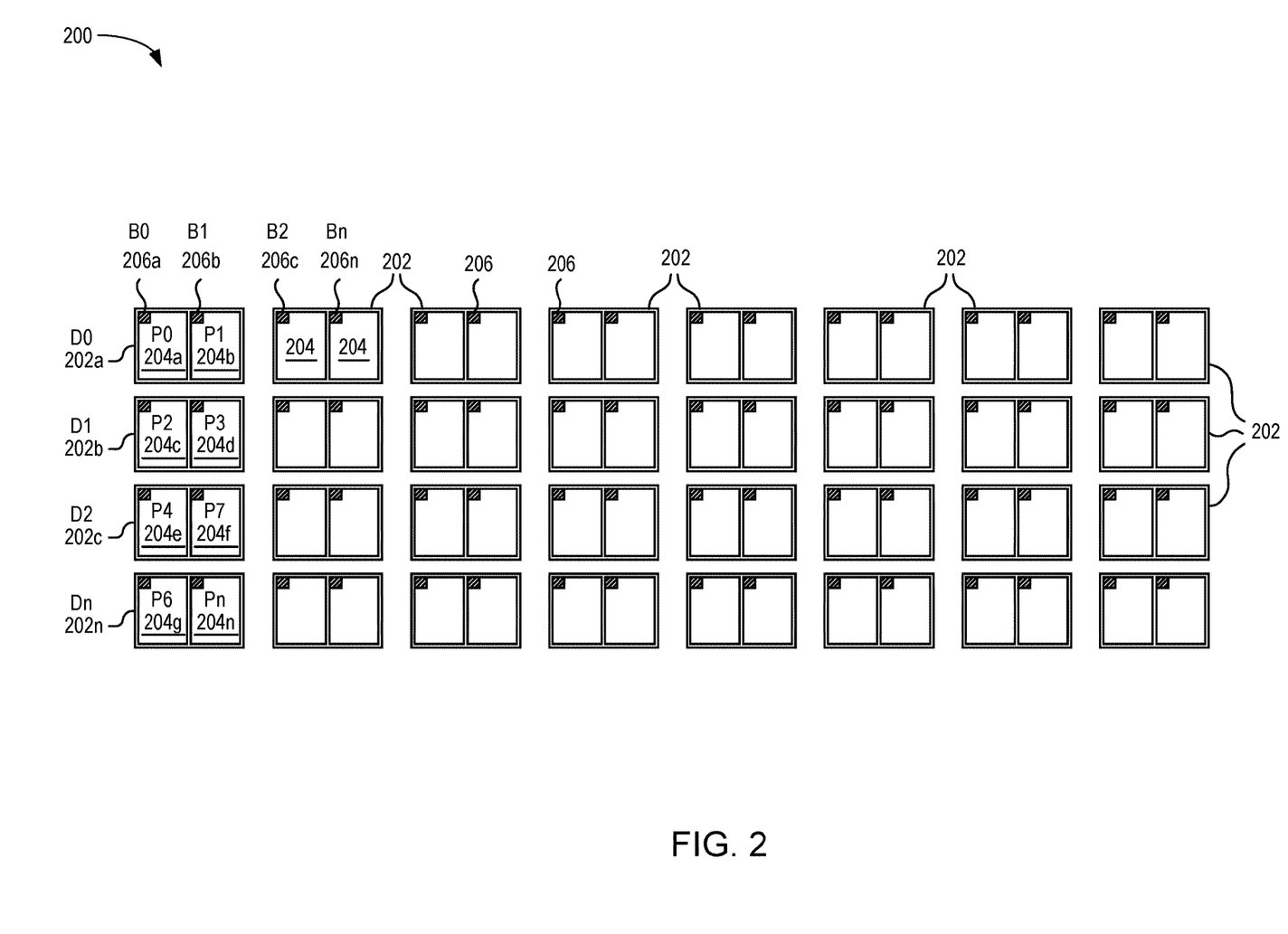
FIG. 2 is an illustration of a memory device, according to certain embodiments.

FIG. 2 is an illustration of a memory device 200, according to certain embodiments. Memory device 200 may be the NVM 110 of FIG. 1. The memory device 200 includes a plurality of dies 202a-202n, collectively referred to as dies 202, where each die of the plurality of dies 202a-202n includes a first plane 204a and a second plane 204b, collectively referred to as planes 204. Each of the planes 204 includes a plurality of blocks 206a-206n, collectively referred to as blocks 206. While 32 dies 202 are shown in the memory device 200, any number of dies may be included.

Figure 3A:
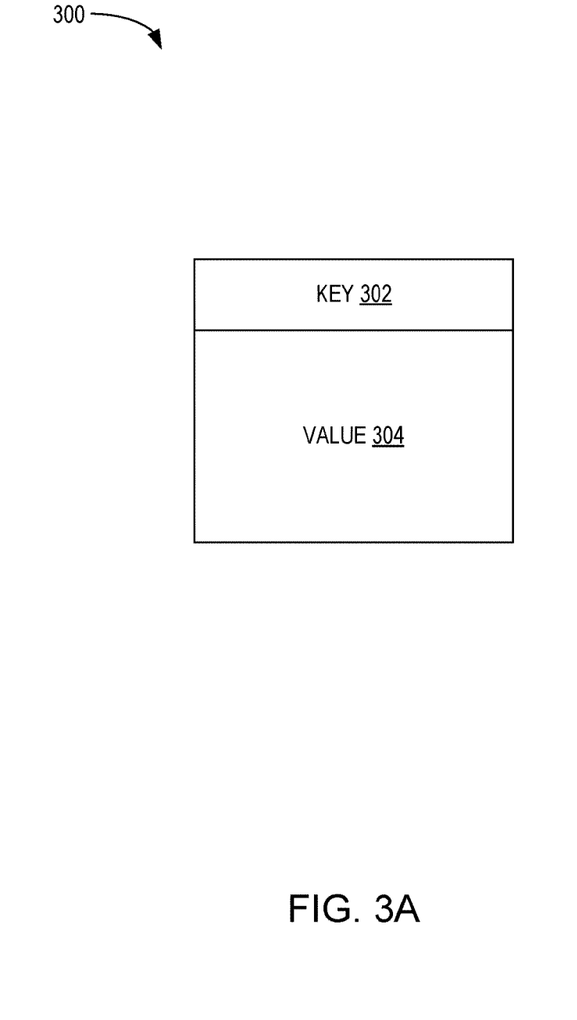
FIG. 3A is an exemplary illustration of a KV pair data, according to certain embodiments.

FIG. 3A is an exemplary illustration of a KV pair data 300, according to certain embodiments. KV pair data 300 includes a key 302 and a value 304, where the data, which may be host data, of the value 304 is addressed by the key 302. The key 302 may have a size of about 1 byte to about 64 bytes and the value 304 may have a size of about 0 bytes to about $2^{32}-1$ bytes. For example, when the value 304 has a size of about 0 bytes, the value 304 is an empty value. It is to be understood that the previously mentioned values are not intended to be limiting, but to provide an example of an embodiment. Because the value 304 may have a size greater than a physical wordline (e.g., greater than 16 KB), the value 304 may be divided across several wordlines and may result in misalignment. Misalignment may occur when partial data from multiple values are stored in a single wordline or when a portion of the value 304 is stored partially on a single wordline. Because misalignment of stored data may result in multiple reads, quality of service of a data storage device storing the misaligned data may be decreased and power consumption of the data storage device may be increased.

Figure 3B:
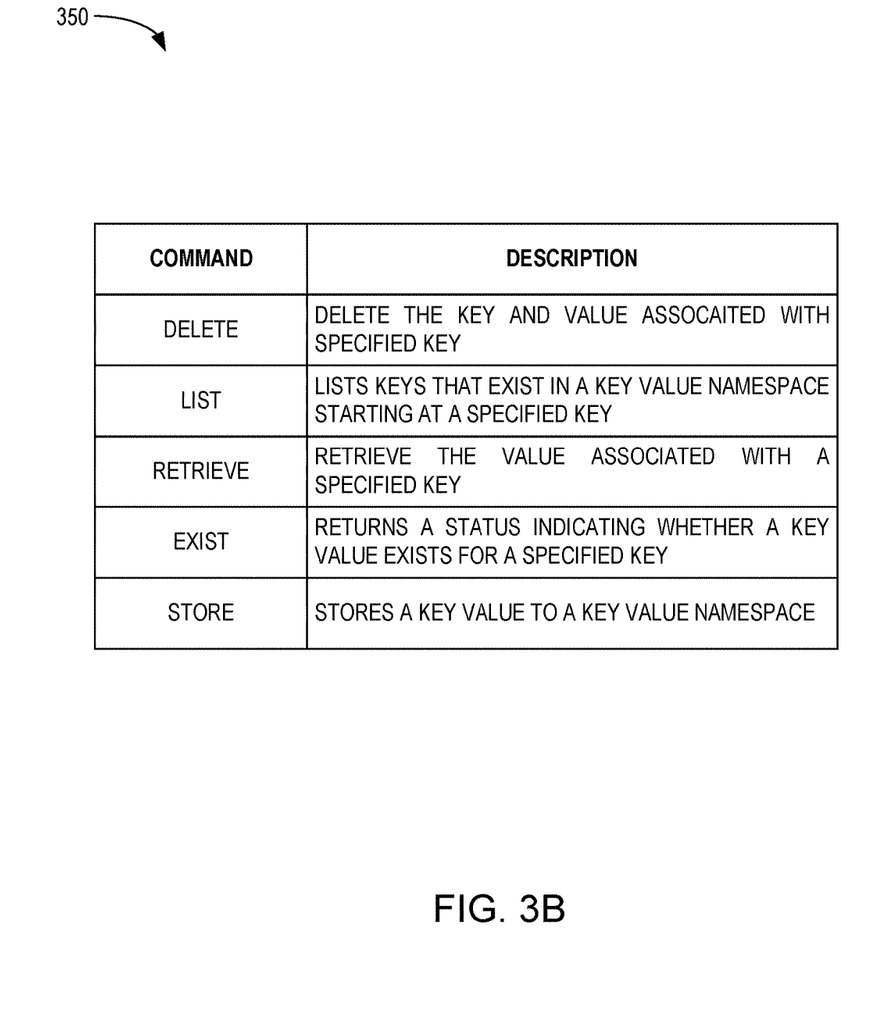
FIG. 3B is a table illustrating a command set for a KV database, according to certain embodiments.

FIG. 3B is a table 350 illustrating a command set for a KV database, according to certain embodiments. For exemplary purposes, aspects of the storage system 100 of FIG. 1 may be referenced herein. A KV system may include a command set that includes, in a non-limiting list, a delete command, a list command, a retrieve command, an exist command, and a store command. The delete command may cause the controller 108 to delete the key 302 and value 304 associated with the key 302. The list command may cause the controller 108 to list keys that exist in a KV namespace starting at a specified key. The exist command may cause the controller 108 to return a status indicating whether a KV pair data 300 exists for a specified key to the command generator, such as the host device 104. The store command may cause the controller 108 to store a KV pair data to a KV namespace.

The retrieve command may cause the controller 108 to retrieve the value 304 associated with a specified key from a KV namespace. The length to be retrieved of the KV pair data 300 is specified in the retrieve command and the location to transfer the KV pair data 300 is specified by either a scatter gather list (SGL) pointer or a physical region page (PRP) pointer in the retrieve command. If the specified length in the retrieve command is less than the length of the KV pair data 300 that is being retrieved, then the controller 108 returns the requested amount and the length of the KV pair data 300 to the completion queue. However, if the specified length in the retrieve command is greater than the length of the KV pair data 300 that is being retrieved, then the controller 108 returns the data from the NVM 110 and the length of the KV pair data 300 is returned to the completion queue.

Figure 4A:
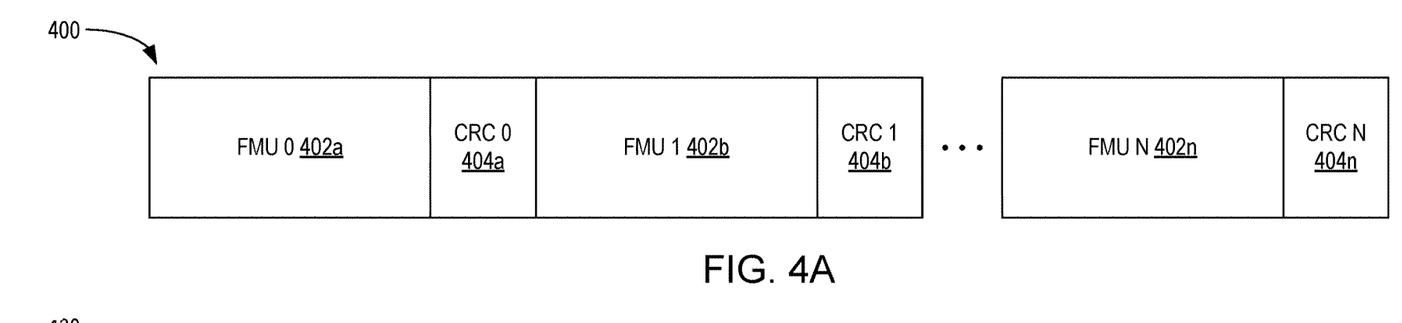
FIGS. 4A-4C are exemplary illustrations of a value stored in a memory device, according to certain embodiments.
Figure 4B:
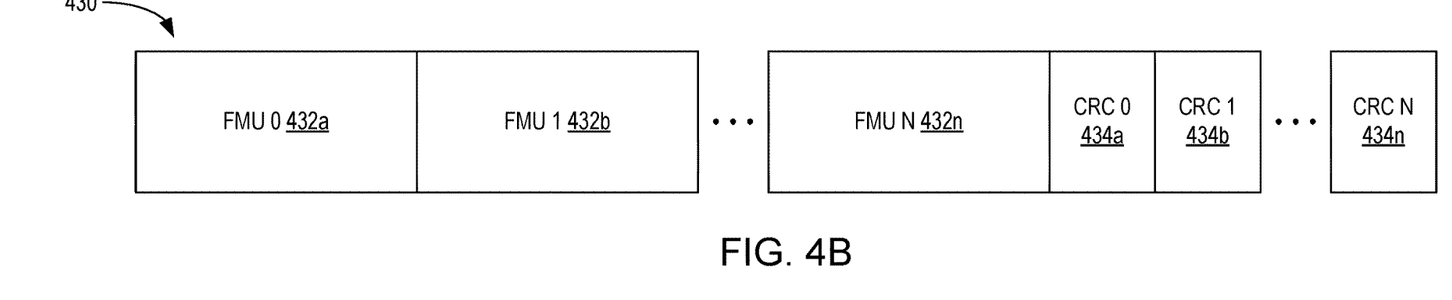
Figure 4C:
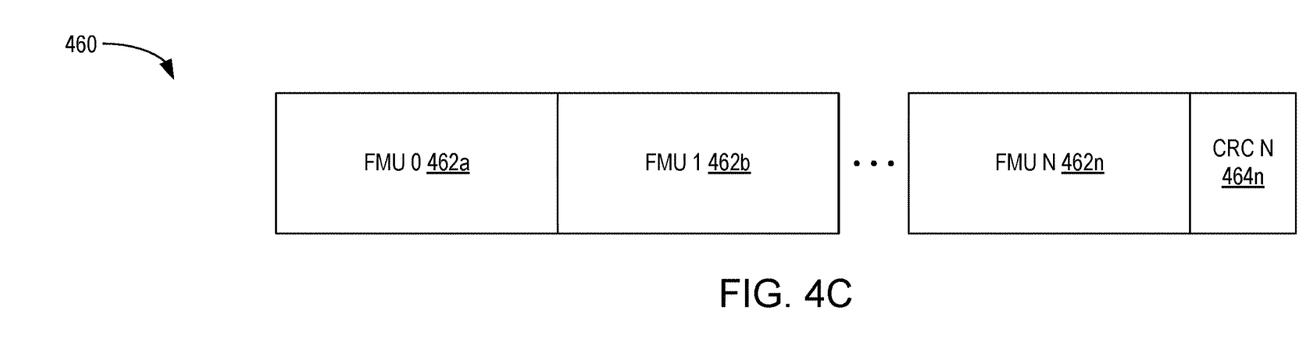

FIGS. 4A-4C are exemplary illustrations of different embodiments of storing a value (e.g., value 400, value 430, and value 460) in a memory device, such as the memory device 200 of FIG. 2, according to certain embodiments. For exemplary purposes, aspects of the storage system 100 of FIG. 1 may be referenced herein. The value 400, 430, 460 may be the value 304 of the KV pair data 300 of FIG. 3. The value 400, 430, 460 comprises a plurality of flash management units (FMUs) 402a-402n, 432a-432n, 462a-462n. Each FMU of the plurality of FMUs 402a-402n, 432a-432n, 462a-462n may have size of about 4 KB. It is to be understood that the embodiments described are not intended to be limiting, but to provide examples of possible embodiments.

When the value 400, 430, 460 is received by the controller 108, the controller 108 may generate checksum signatures, of which cyclic redundancy code (CRC) signatures are but one example (e.g., CRC signatures 404a-404n, 434a-434n, 464n) for each of the FMUs 402a-402n, 432a-432n, 462a-462n. It is to be understood that while CRC signatures are exemplified as the checksum signature in FIGS. 4A-4C, the checksum signature is not limited to CRC signatures. Rather, other checksum signatures are contemplated. The CRC signatures are merely for exemplification purposes. In other words, each FMU is associated with a checksum signature. The checksum signature may be utilized to ensure that data requested by the host device 104 is returned to the host device 104 without corruption. When reading the checksum signature back from the NVM 110 along with the requested data, another checksum signature is generated based on the requested data read from the NVM 110. The checksum signature for the data read from the NVM 110 is compared to the another checksum signature (generated based on the requested data read from the NVM 110). If the checksum signatures match, then the requested data is sent back to the host device 104. However, if the checksum signatures do not match, then a read failure may be sent back to the host device 104 indicating that the data has been corrupted.

Value 400 illustrates an example where the checksum signature associated with a respective FMU is programmed with the respective FMU. For example, when programming the value 400 to the NVM 110, the first FMU 402a is programmed first, then the first CRC signature 404a is programmed after the first FMU 402a, then the second FMU 402b is programmed after the first CRC signature 404a, and so-forth. Value 430 illustrates an example where the checksum signatures associated with the FMUs of the value 430 are programmed after the FMUs of the value 430 are programmed to the NVM 110. For example, FMUs 432a-432n are programmed to the NVM 110 and then CRC signatures 434a-434n are programmed after the FMUs 432a-432n are programmed to the NVM 110. Furthermore, the CRC signatures 434a-434n are programmed in order of the FMUs 432a-432n in order to ensure read coherency when reading the value 430 from the NVM 110. It is to be understood that the CRC signatures 434a-434n may be programmed to a same location as the FMUs 432a-432n or different location (including a different memory device) than the FMUs 432a-432n. Value 460 illustrates an example where a CRC signature 464n is associated with all of the FMUs of the value 460 is programmed with a last FMU 462n of the value 460.

Referring to FIGS. 4A and 4B, the CRC signatures 404b-404n, 434b-434n may be associated with two or more consecutive adjacent FMUs. In other words, a checksum signature may be associated with a current FMU (i.e., the FMU that the checksum is generated for) and each previous adjacent FMU (i.e., the FMUs of the value that in advance of the current FMU). For example, for a second FMU 402b, 432b, the current FMU is the second FMU 402b and the previous FMU is the first FMU is 402a. Each of the checksum signatures generated may have a constant size or a variable size. In examples, where each checksum signature is a variable size, each following adjacent checksum signature (i.e., second CRC signature 404b follows first CRC signature 404a) is a predetermined size larger than the previous checksum signature. For example, if a first checksum signature has a size of about 16 bits, then the second checksum signature, which is adjacent and next to the first checksum signature, is 18 bits. In other words, the predetermined size may be 2 bits. It is to be understood that the previously listed values are not intended to be limiting, but to provide an example of a possible embodiment.

Furthermore, when the host device 104 sends a read request for the value 400, 430, 460, the host device 104 may send the respective key (e.g., the key 302 of FIG. 3A) associated with the value 400, 430, 460 with a request to read a specific FMU of the value 400, 430, 460. Rather than reading each FMU and determining whether each FMU has valid data or has corrupted data (by utilizing a checksum signature comparison), only the respective checksum signature associated with the FMU requested is needed. In other words, if an n-th FMU is requested, then the respective value is read from the NVM 110 and the respective n-th checksum signature associated with the n-th FMU is compared with a generated checksum signature associated with the n-th FMU requested.

Because each checksum signature is associated with a current FMU and each previous FMU, a longer codeword is achieved and the overall detection of errors capability and the correction capability of the corresponding value is stronger. Furthermore, because the checksum signature utilized for the value may be chosen as either using only a last checksum signature, a constant size checksum signature, or a variable size checksum signature, the end-to-end (E2E) protection of data within the data storage device 106 may be improved. In some examples, the amount of E2E checksum overhead may be reduced which may allow for more space for metadata and user data. In cases where only a last checksum signature is utilized, the additional space saved (by not having a checksum signature for each previous FMU from the last FMU of the value) may be utilized for error correction code (ECC) improvement, such as more complex and advanced checksum codes, additional header information, or user data.

Figure 5:
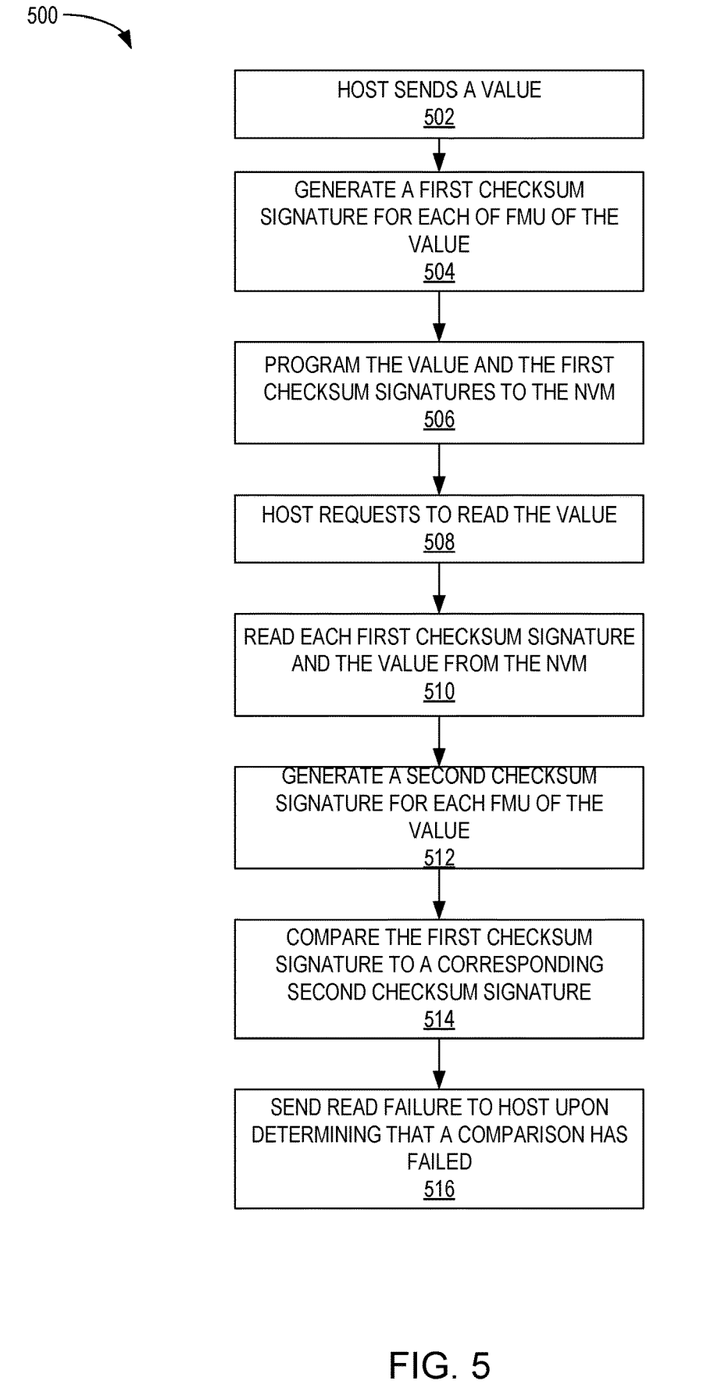
FIG. 5 is a flow diagram illustrating a method of protecting a value using an exemplary checksum signature, cyclic redundancy code (CRC) signatures, according to certain embodiments.

FIG. 5 is a flow diagram illustrating a method 500 of protecting a value using checksum signatures, of which cyclic redundancy code (CRC) signatures are but one example, according to certain embodiments. Method 500 may be implemented by a controller, such as the controller 108 of FIG. 1. For exemplary purposes, aspects of the storage system 100 may be referenced herein.

At block 502, the host device 104 sends a value to the controller 108. The value is associated with a key. At block 504, the controller 108 generates a first checksum signature for each FMU of the value. The first checksum signature generated is associated with a respective FMU of the value. At block 506, the controller 108 programs the value and each of the first checksum signatures to the NVM 110. At block 508, the controller 108 receives a read request from the host device 104 to read the value using the key. At block 510, the controller 108 reads each first checksum signature and the value from the NVM 110. At block 512, the controller generates a second checksum signature for each FMU of the value, where the second checksum signature is based on the FMUs read from the NVM 110. At block 514, the controller compares the first checksum signatures to a respective second checksum signature. At block 516, the controller 108 sends a read failure message to the host device 104 upon determining that at least one comparison has failed.

Figure 6:
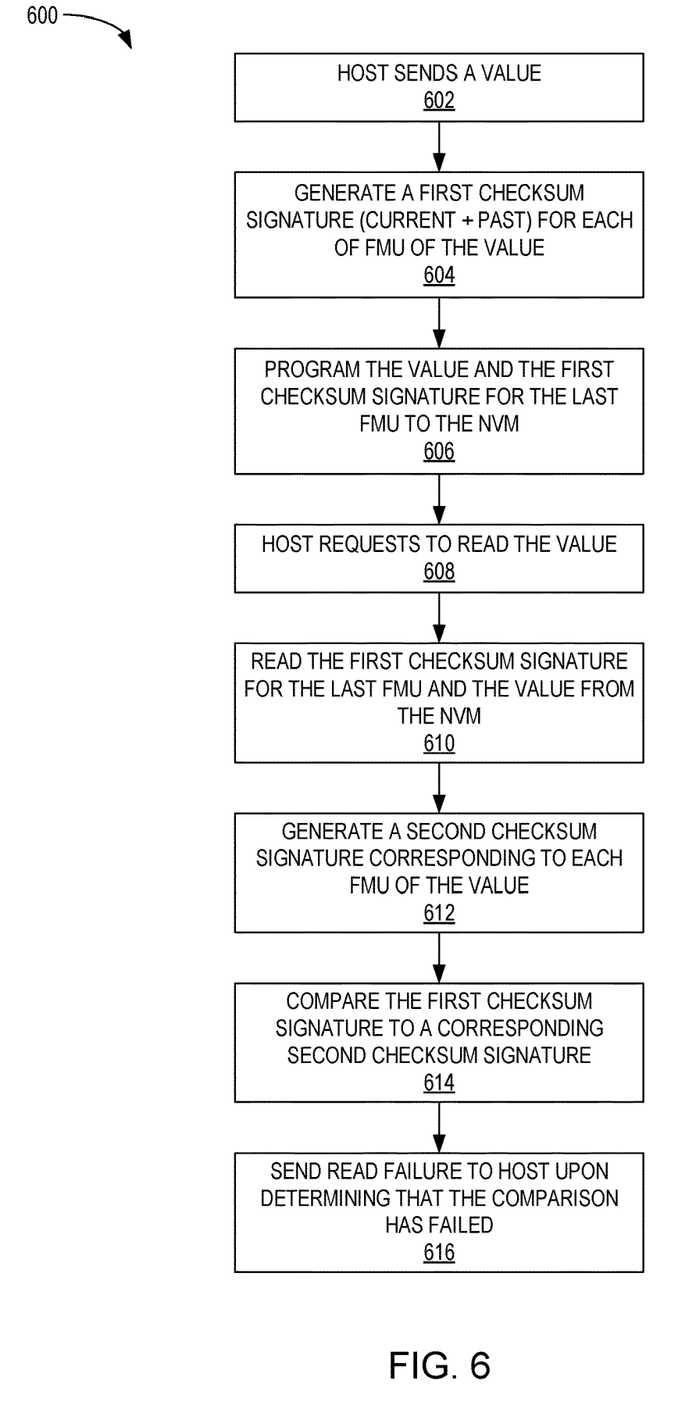
FIG. 6 is a flow diagram illustrating a method of protecting a value using an exemplary checksum signature, a cyclic redundancy code (CRC) signature, according to certain embodiments.

FIG. 6 is a flow diagram illustrating a method 600 of protecting a value using a checksum signature, of which a cyclic redundancy code (CRC) signature is but one example, according to certain embodiments. Method 600 may be implemented by a controller, such as the controller 108 of FIG. 1. For exemplary purposes, aspects of the storage system 100 may be referenced herein.

At block 602, the host device 104 sends a value to the controller 108. The value is associated with a key. At block 604, the controller 108 generates a first checksum signature for each FMU of the value. The first checksum signature generated is associated with a respective FMU (i.e., a current FMU) and each previous FMU (i.e., each previous adjacent FMU to the current FMU) of the value. At block 606, the controller 108 programs the value and the first checksum signature associated with the last FMU to the NVM 110. At block 608, the controller 108 receives a read request from the host device 104 to read the value using the key. At block 610, the controller 108 reads the first checksum signature associated with the last FMU and the value from the NVM 110. At block 612, the controller generates a second checksum signature for the value, where the second checksum signature is based on each of FMUs read from the NVM 110. At block 614, the controller compares the first checksum signature to the second checksum signature. At block 616, the controller 108 sends a read failure message to the host device 104 upon determining that the comparison has failed.

Figure 7:
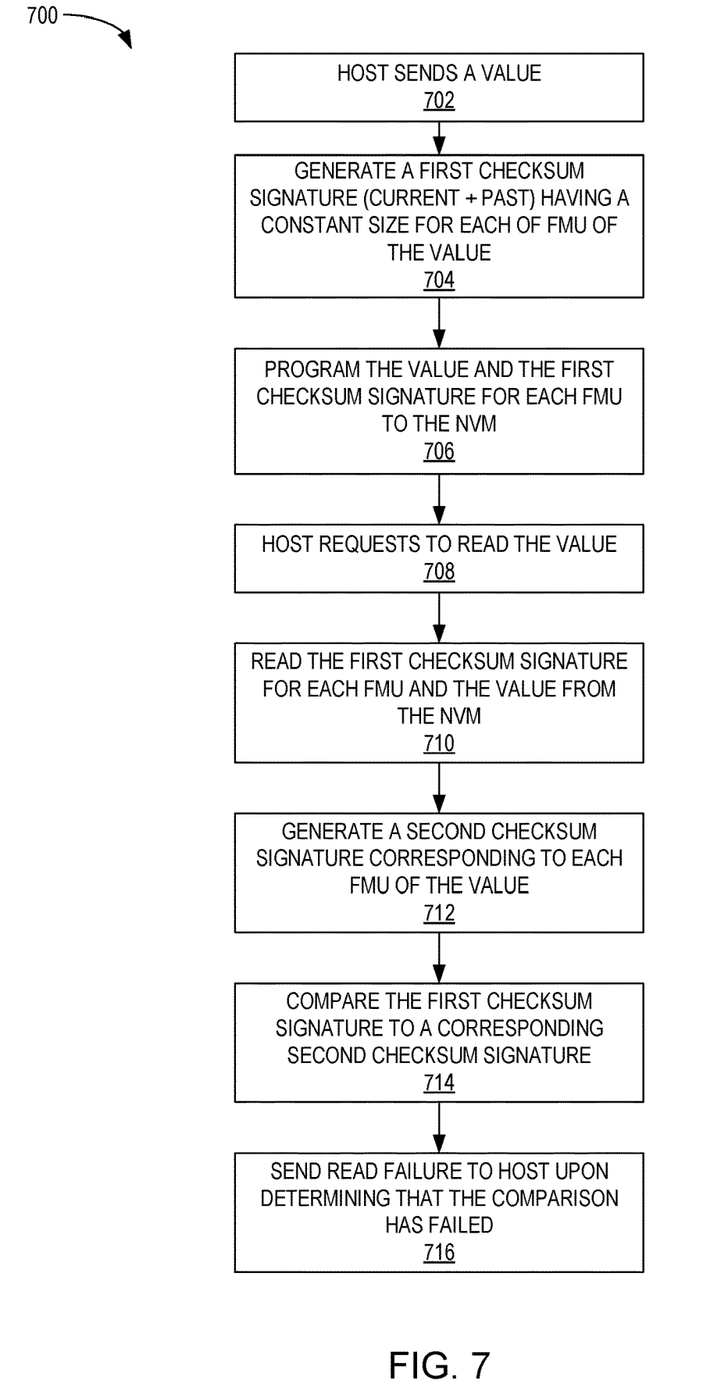
FIG. 7 is a flow diagram illustrating a method of protecting a value using an exemplary checksum signature, cyclic redundancy code (CRC) signatures, according to certain embodiments.

FIG. 7 is a flow diagram illustrating a method 700 of protecting a value using checksum signatures, of which cyclic redundancy code (CRC) signatures are but one example, according to certain embodiments. Method 700 may be implemented by a controller, such as the controller 108 of FIG. 1. For exemplary purposes, aspects of the storage system 100 may be referenced herein.

At block 702, the host device 104 sends a value to the controller 108. The value is associated with a key. At block 704, the controller 108 generates a first checksum signature for each FMU of the value, where each first checksum signature has a constant size. The first checksum signature generated is associated with a respective FMU (i.e., a current FMU) and each previous FMU (i.e., each previous adjacent FMU to the current FMU) of the value. At block 706, the controller 108 programs the value and each of the first checksum signatures to the NVM 110. At block 708, the controller 108 receives a read request from the host device 104 to read the value using the key. At block 710, the controller 108 reads each first checksum signature and the value from the NVM 110. At block 712, the controller generates a second checksum signature for each FMU of the value, where the second checksum signature is based on the FMUs read from the NVM 110. At block 714, the controller compares the first checksum signatures to a respective second checksum signature. At block 716, the controller 108 sends a read failure message to the host device 104 upon determining that at least one comparison has failed.

Figure 8:
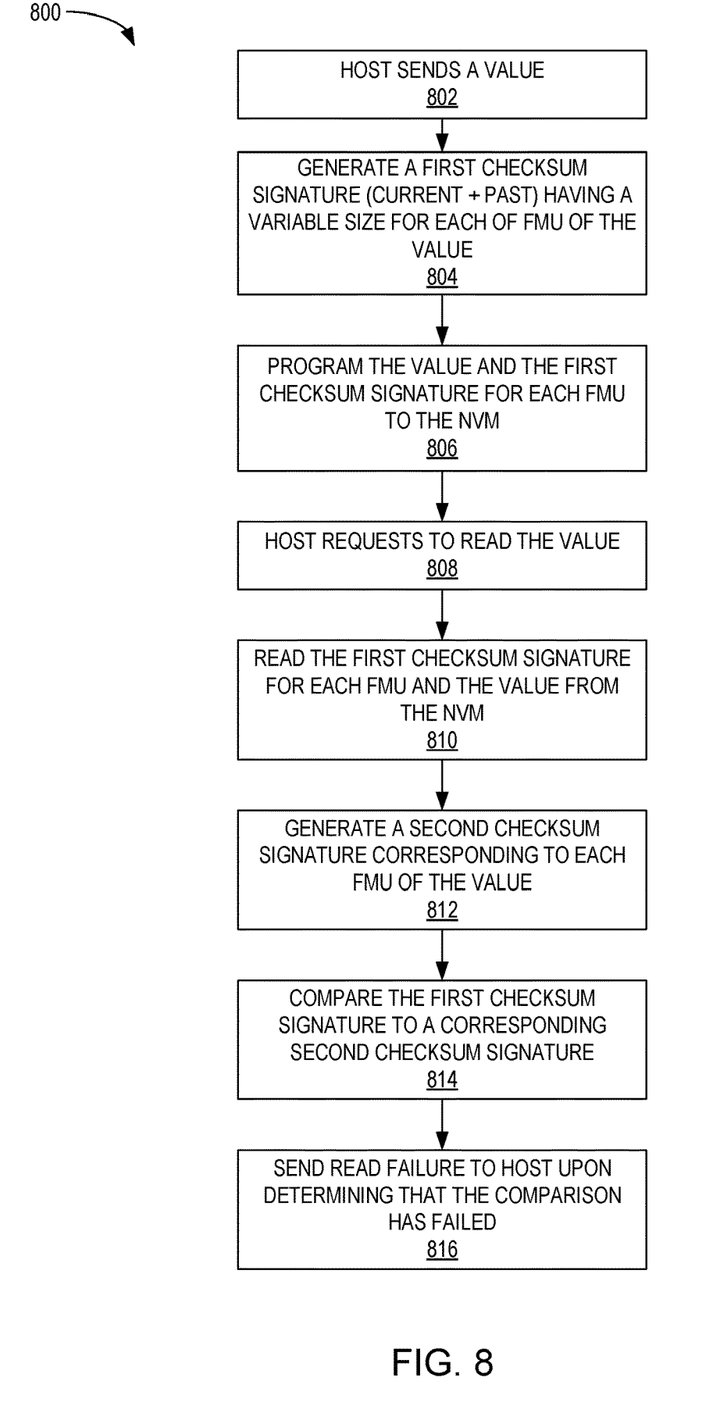
FIG. 8 is a flow diagram illustrating a method of protecting a value using an exemplary checksum signature, cyclic redundancy code (CRC) signatures, according to certain embodiments.

FIG. 8 is a flow diagram illustrating a method 800 of protecting a value using a checksum signature, of which a cyclic redundancy code (CRC) signature is but one example, according to certain embodiments. Method 800 may be implemented by a controller, such as the controller 108 of FIG. 1. For exemplary purposes, aspects of the storage system 100 may be referenced herein.

At block 802, the host device 104 sends a value to the controller 108. The value is associated with a key. At block 804, the controller 108 generates a first checksum signature for each FMU of the value, where each first checksum signature has a variable size, where each subsequent first checksum signature is a predetermined size larger than a previous first checksum signature. The first checksum signature generated is associated with a respective FMU (i.e., a current FMU) and each previous FMU (i.e., each previous adjacent FMU to the current FMU) of the value. At block 806, the controller 108 programs the value and each of the first checksum signatures to the NVM 110. At block 808, the controller 108 receives a read request from the host device 104 to read the value using the key. At block 810, the controller 108 reads each first checksum signature and the value from the NVM 110. At block 812, the controller generates a second checksum signature for each FMU of the value, where the second checksum signature is based on the FMUs read from the NVM 110. At block 814, the controller compares the first checksum signatures to a respective second checksum signature. At block 816, the controller 108 sends a read failure message to the host device 104 upon determining that at least one comparison has failed.

By taking advantage of characteristics of a value of a key value pair data, CRC signatures may be optimized to improve the integrity of the value as well as may reduce the rate of failure of the data storage device.

In one embodiment, a data storage device includes a memory device and a controller coupled to the memory device. The controller is configured to receive key value (KV) pair data from a host device, where the KV pair data includes a key and a value, where the key addresses the value, and where the value includes two or more flash management units (FMUs), generate a first checksum signature for the received value, where the first checksum signature is generated for an aggregated number of consecutive adjacent FMUs of the value, and program the generated first checksum signature and the value to the memory device.

The aggregated number of consecutive adjacent FMUs of the value is all of the FMUs of the value. The aggregated number of consecutive adjacent FMUs of the value for the first checksum signature is a first FMU of the value. The controller is further configured to generate a second checksum signature for the received value, where the second checksum signature is generated for an aggregated number of consecutive adjacent FMUs of the value, and the aggregated number of consecutive adjacent FMUs of the second checksum signature is the first FMU and a second FMU of the value. In one embodiment, the first checksum signature and the second checksum signature are a same size and wherein the first checksum is a cyclic redundancy code (CRC) signature. In another embodiment, the second checksum signature is a predetermined size larger than the first checksum signature. The first checksum signature is for the two or more FMUs. The first checksum signature is generated after the last FMU of the two or more FMUs is received from the host. The controller is further configured to receive the key from a host device, utilize the key to retrieve the value from the memory device, where retrieving the value further comprises retrieving the first checksum signature, generating a read checksum signature for the value retrieved from the memory device, and determining whether the read checksum signature matches the first checksum signature. The controller is further configured to send the value to the host device when the read checksum signature matches the first checksum signature. The controller is further configured to send an error message to the host device when the read checksum signature does not match the first checksum signature.

In another embodiment, a data storage device includes a memory device and a controller coupled to the memory device. The controller is configured to generate a checksum signature for a value of a key value (KV) pair data. The KV pair data includes a key and a value. The key addresses the value. The value includes two or more flash management units (FMUs). The checksum signature is generated for a first FMU and each two or more consecutive adjacent FMUs after the first FMU.

The checksum signature is programmed to the memory device with the last FMU of the plurality of FMUs of the value. The controller is further configured to receive the key in a read request for the value, where the key further includes a specific FMU of the value, retrieve the value and the checksum signature from the memory device, where the checksum signature retrieved corresponds with the specific FMU of the value. The controller is further configured to receive the key in a read request for the value, where the key further includes a specific FMU of the value, and retrieve the value and the checksum signature from the memory device, where the checksum signature retrieved corresponds with the last FMU of the plurality of FMUs of the value. In one embodiment, the checksum signature for each of the two or more consecutive adjacent FMUs has a same size. In another embodiment, the checksum signature for each of the two or more consecutive adjacent FMUs has a variable size. The two or more consecutive adjacent FMUs include each previous FMU to a current FMU of the two or more consecutive adjacent FMUs.

In another embodiment, a data storage device includes means to store data and a controller coupled to the means to store data. The controller is configured to generate a checksum signature for each flash management unit (FMU) of a value of a key value (KV) pair data, where the KV pair data comprises a key and the value, where the key addresses the value, where the value comprises a plurality of FMUs, and where the checksum signature generated for each of the FMUs other than a first FMU of the plurality of FMUs is associated with a current FMU and each previous FMU of the plurality of FMUs, program the value and each checksum signature to the means to store data, receive a read request comprising the key from a host device, retrieve the value and a checksum signature associated with an FMU requested by the read request from the means to store data, generate another checksum signature for the retrieved value, wherein the another checksum signature is associated with the FMU requested and each previous FMU relative to the FMU requested, determine that the another checksum signature matches the checksum signature retrieved, and provide the value to the host device. Each checksum signature generated for each of the FMUs other than a first FMU of the plurality of FMUs includes either a constant size or a variable size.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
   a memory device; and
   a controller coupled to the memory device, wherein the controller is configured to:

receive key value (KV) pair data from a host device,
wherein:
the KV pair data comprises a key and a value;
the key addresses the value; and
the value comprises two or more flash management units (FMUs);
generate a first checksum signature for the received value, wherein the first checksum signature is generated for an aggregated number of consecutive adjacent FMUs of the value, and wherein the aggregated number of consecutive adjacent FMUs of the value for the first checksum signature is a first FMU of the value;
program the generated first checksum signature and the value to the memory device; and
generate a second checksum signature for the received value, wherein:
the second checksum signature is generated for an aggregated number of consecutive adjacent FMUs of the value; and
the aggregated number of consecutive adjacent FMUs of the second checksum signature is the first FMU and a second FMU of the value.

2. The data storage device of claim 1, wherein the first checksum signature and the second checksum signature are a same size and wherein the first checksum is a cyclic redundancy code (CRC) signature.

3. The data storage device of claim 1, wherein the second checksum signature is a predetermined size larger than the first checksum signature.

4. The data storage device of claim 1, wherein the first checksum signature is for the two or more FMUs.

5. The data storage device of claim 1, wherein the first checksum signature is generated after a last FMU of the two or more FMUs is received from a host.

6. The data storage device of claim 1, wherein the controller is further configured to:
receive the key from a host device;
utilize the key to retrieve the value from the memory device, wherein retrieving the value further comprises retrieving the first checksum signature; and
determine whether the second checksum signature matches the first checksum signature.

7. The data storage device of claim 6, wherein the controller is further configured to:
send the value to the host device when the second checksum signature matches the first checksum signature.

8. The data storage device of claim 6, wherein the controller is further configured to:
send an error message to the host device when the second checksum signature does not match the first checksum signature.

9. A data storage device, comprising:
a memory device; and
a controller coupled to the memory device, wherein the controller is configured to:
generate a first checksum signature for a value of a key value (KV) pair data, wherein:
the KV pair data comprises a key and the value;
the key addresses the value;
the value comprises a plurality of flash management units (FMUs); and
the first checksum signature is generated for a first FMU and each two or more consecutive adjacent FMUs after the first FMU; and
generate a second checksum signature for the value, wherein:
the second checksum signature is generated for an aggregated number of consecutive adjacent FMUs of the value; and
the aggregated number of consecutive adjacent FMUs of the second checksum signature is the first FMU and a second FMU of the value.

10. The data storage device of claim 9, wherein the first checksum signature is programmed to the memory device with a last FMU of the plurality of FMUs of the value.

11. The data storage device of claim 9, wherein the controller is further configured to:
receive the key in a read request for the value, wherein the key further includes a specific FMU of the value; and
retrieve the value and the first checksum signature from the memory device, wherein the first checksum signature retrieved corresponds with the specific FMU of the value.

12. The data storage device of claim 9, wherein the controller is further configured to:
receive the key in a read request for the value, wherein the key further includes a specific FMU of the value; and
retrieve the value and the first checksum signature from the memory device, wherein the first checksum signature retrieved corresponds with the last FMU of the plurality of FMUs of the value.

13. The data storage device of claim 9, wherein the first checksum signature for each of the two or more consecutive adjacent FMUs has a same size.

14. The data storage device of claim 9, wherein the first checksum signature for each of the two or more consecutive adjacent FMUs has a variable size.

15. The data storage device of claim 9, wherein the two or more consecutive adjacent FMUs comprises each previous FMU to a current FMU of the two or more consecutive adjacent FMUs.

16. A data storage device, comprising:
means to store data; and
a controller coupled to the means to store data, wherein the controller is configured to:
generate a checksum signature for each flash management unit (FMU) of a value of a key value (KV) pair data, wherein:
the KV pair data comprises a key and the value;
the key addresses the value;
the value comprises a plurality of FMUs; and
the checksum signature generated for each of the FMUs other than a first FMU of the plurality of FMUs is associated with a current FMU and each previous FMU of the plurality of FMUs;
program the value and each checksum signature to the means to store data;
receive a read request comprising the key from a host device;
retrieve the value and a checksum signature associated with an FMU requested by the read request from the means to store data;
generate another checksum signature for the retrieved value, wherein:
the another checksum signature is associated with the FMU requested and each previous FMU relative to the FMU requested;
the another checksum signature is generated for an aggregated number of consecutive adjacent FMUs of the value; and the aggregated number of consecutive adjacent FMUs of the another checksum signature is the FMU requested by the read request and a second FMU of the value;
determine that the another checksum signature matches the checksum signature retrieved; and
provide the value to the host device.

17. The data storage device of claim 16, wherein each checksum signature generated for each of the FMUs other than a first FMU of the plurality of FMUs comprises either:
a constant size; or
a variable size.

18. The data storage device of claim 16, wherein the checksum signature associated with an FMU requested by the read request from the means to store data and the another checksum signature are a same size and wherein each checksum signature generated for each of the FMUs other than a first FMU of the plurality of FMUs are cyclic redundancy code (CRC) signatures.

19. The data storage device of claim 16, wherein the another checksum signature is a predetermined size larger than checksum signature associated with an FMU requested by the read request from the means to store data.

20. The data storage device of claim 16, wherein the controller is further configured to:
send an error message to the host device when the another checksum signature does not match the checksum signature associated with an FMU requested by the read request from the means to store data.

* * * * *